United States Patent [19]
Allison

[11] 3,738,201
[45] June 12, 1973

[54] METHOD AND APPARATUS FOR SHARPENING SAW BLADES

[75] Inventor: Rudolph L. Allison, Rockford, Ill.

[73] Assignee: Paramount Textile Machinery Co., Chicago, Ill.

[22] Filed: Sept. 24, 1971

[21] Appl. No.: 186,520

[52] U.S. Cl.............. 76/112 R, 76/25 R, 76/41 R, 51/225 R
[51] Int. Cl... B23d 63/00, B23d 63/12, B24b 19/00
[58] Field of Search..................... 76/25, 31, 32, 33, 76/34, 46, 47, 47 A, 78, 79, 8 D, 40, 41, 42, 43, 44, 45, 47 B, 48; 51/112, 225

[56] References Cited
UNITED STATES PATENTS

| | | | |
|---|---|---|---|
| 1,045,052 | 11/1912 | McLean et al. | 76/48 R |
| 2,638,018 | 5/1953 | Davis et al. | 76/37 R |
| 3,279,282 | 10/1966 | Gill | 76/40 R |
| 3,295,396 | 1/1967 | Kolb | 76/25 R |
| 3,034,378 | 5/1962 | Anderson | 76/112 R |
| 2,770,930 | 11/1956 | Norman | 51/225 R |

*Primary Examiner*—Harrison L. Hinson
*Attorney*—James E. Cockfield

[57] ABSTRACT

Method and apparatus for orienting saw blades cutting teeth wherein all correspondingly oriented lateral cutting surfaces of teeth that are abraded and/or brazed are congruently oriented with respect to any plane perpendicular to the axis of rotation of the blade body, essentially independently of any waviness in the blade body. Laterally floating clamps on opposite sides of the blade body operate to sense the location of that body and releasably clamp the body essentially without disturbing waviness. Abrading is carried out at essentially the same relative orientation during each successive abrading operating, while the blade is gripped.

5 Claims, 4 Drawing Figures

PATENTED JUN 12 1973 3,738,201
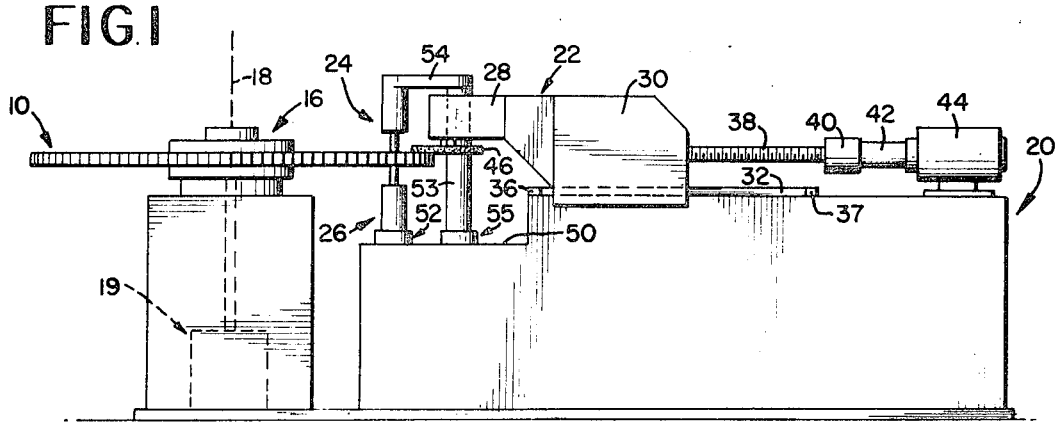
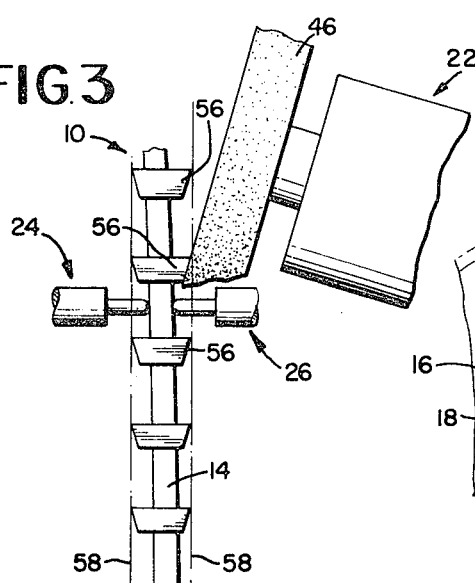
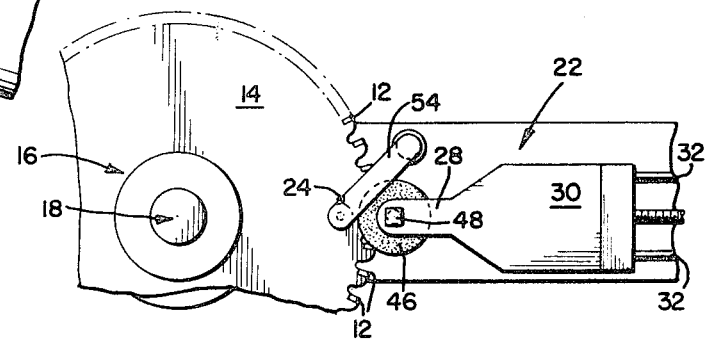
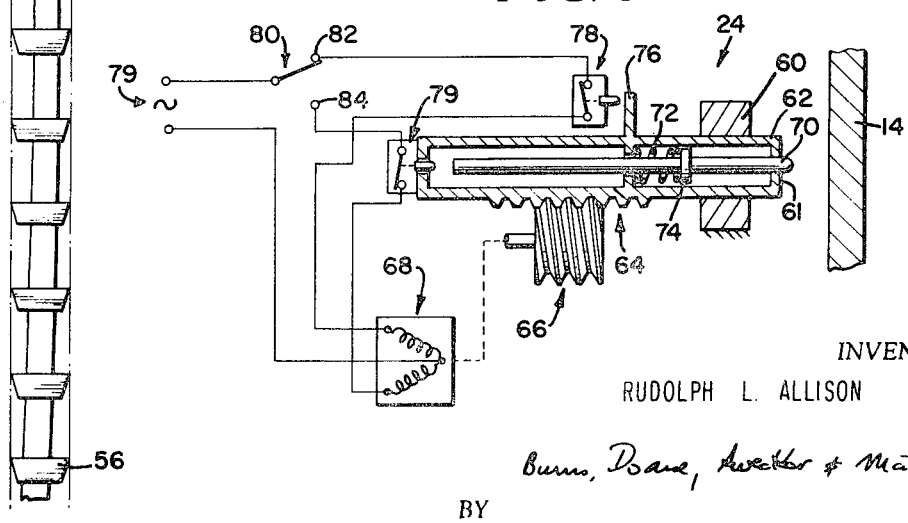
INVENTOR
RUDOLPH L. ALLISON
BY Burns, Doane, Swecker & Mathis
ATTORNEYS

METHOD AND APPARATUS FOR SHARPENING SAW BLADES

BACKGROUND OF THE INVENTION

This invention relates to a method and apparatus for providing properly oriented cutting faces of saw blade cutting teeth. More particularly this invention relates to such a method and apparatus wherein the abrading of such cutting faces or even the initial positioning of such faces is accomplished essentially independently of any waviness that may exist in the blade body.

During the use of circular saw blades, particularly carbide tipped blades employed in cutting steel bar stock, the problem of blade life (i.e. the frequency with which the cutting teeth have to be resharpened or with which the blade need be replaced) is particularly acute. In the past attempts directed toward increasing blade life have been made.

These attempts have involved a practice denominated as hammering. According to this practice, the blade body which carries the cutting teeth is tensioned to impart a proper amount of stiffness thereto while at the same time providing a true running tool with minimal run out. In this connection a 0.004 inch run out (i.e. amount of lateral waviness in the blade body as it is rotated about its cutting axis) has been considered generally acceptable.

As will be appreciated, it had generally been considered that in the absence of an essentially true running blade body, the waviness in the blade body would cause significant chatter as the corresponding lateral cutting faces of the successive teeth sequentially entered the cutting zone at different lateral locations relative to the bounding workpiece portions on opposite sides of the cut. Thus, by reason of the waviness, sequentially entering cutting teeth would be physically pressed from side to side as they were forced to enter the cut. The resulting chatter and wear greatly contributed to a reduction in blade life.

According to the present invention, the significance of hammering to enhance true running of the tool can be reduced. Moreover, the problems of waviness of the blade body as they bear upon blade life can be minimized or eliminated. This is accomplished by taking steps to insure that all correspondingly oriented lateral cutting surfaces of successive teeth are essentially identically oriented with respect to a plane perpendicular to the axis of rotation of the blade body. In this fashion, the relative location between each corresponding cutting tooth and the workpiece remains essentially the same independently of any waviness in the blade body.

As hereinafter more fully described, the essentially identical orientation of the corresponding cutting surfaces is realized by altering the position of clamping means that hold the blade body during sequential operations such as grinding, that effect the orientation. These operations are then all performed in connection with each tooth relative to the same plane perpendicular to the axis of rotation of the blade body.

Clamp means have been previously employed to hold the blade body during grinding operations sequentially performed in connection with successive cutting surfaces. However, once the clamp means were set for a grinding operation on a tooth surface, the clamp means remained identically set for the successive grinding operations in connection with similarly positioned tooth surfaces. All these grinding operations were then performed at the same location, that location being determined relative to the basically fixed position clamping means.

It will be appreciated that such a technique may increase rather than reduce the chatter and wear problem earlier discussed. If the blade body has any waviness, this waviness is disturbed during grinding operations since the clamping means is in the same position after the blade is indexed for each grinding operation. In other words, the fixed position of the clamping means functions to press the waviness out of the indexed blade body. Each grinding operation then insures only that corresponding cutting surfaces are identically oriented with respect to the clamping means at the time of grinding. Thus, these surfaces are nonuniformly oriented with respect to a plane perpendicular to the axis of blade rotation when the blade is permitted to spring back to a relaxed position after it is removed from the clamping zone. Since the blade is utilized in this relaxed position wherein waviness is basically returned to the blade, the chatter and wear problem is present to contribute to a reduction in blade life.

During a conference prior to the time of conception of the present invention, it was suggested by another that a blade body might be clamped during a grinding operation by laterally floating clamp means that would not disturb waviness of that body. This suggestion was not however, accompanied by a specific suggestion that the use of floating clamp means could be coupled with performance of each grinding operation at the same location relative to the same plane perpendicular to the axis of rotation of the blade body.

The present invention is directed to an improvement wherein each successive grinding operation is so performed. In this fashion, it may be insured that all correspondingly positioned lateral cutting, surfaces of successive teeth are essentially identically oriented with respect to the same plane during use. The independence of this orientation from any waviness in the blade body aids in enhancing blade life since the teeth basically follow one another into the cutting zone in the same location relative to the workpiece.

OBJECTS AND SUMMARY OF PREFERRED FORMS OF THE INVENTION

Recognizing the need for improved blade life and that the importance of the presence or absence of an essentially true running blade body can be minimized while still enhancing the conforming entry of successive teeth of a circular saw blade into a cutting zone, and further recognizing that the use of floating clamp means without disturbing the waviness of the blade body can be combined with the performance, relative to the same plane perpendicular to the blade body axis of rotation, of operations that effect the orientation of corresponding cutting surfaces, it is a general object of the invention to provide an improved method and apparatus for orienting such cutting surfaces.

It is a particular object of the invention to provide such an improved method and apparatus wherein each successive abrading operation associated with corresponding cutting surfaces of indexed teeth is performed basically identically relative the same plane perpendicular to the axis of rotation, while the blade body is held by floating clamp means without disturbing any waviness in the blade body.

A preferred method of the present invention entails a method of abrading lateral surfaces of carbide cutting teeth inserts of a rotary saw blade including the steps of: clamping or gripping the body of the saw blade, essentially without disturbing any waviness of the body, between laterally floating clamp means on opposite sides of the body, which clamp means operate to sense the location of the blade body and clamp it in that location; abrading one of said lateral surfaces of a cutting tooth with the saw blade body clamped by the clamp means; releasing the clamp means from the saw blade body; rotatably indexing the saw blade to a position for subsequent abrading of a correspondingly positioned lateral surface of a successive cutting tooth; repeating the clamping step with laterally floating clamp means on opposite sides of the body; and abrading the correspondingly positioned lateral surface. According to the improvement of the present invention, each successive one of the above abrading steps is performed at essentially the same location relative to the same plane perpendicular to the axis of rotation of the blade body. Thus, all correspondingly oriented lateral cutting surfaces that are abraded are congruently oriented with respect to any plane perpendicular to the axis of rotation of the blade body.

A preferred apparatus of the invention entails apparatus for abrading the lateral surfaces including: laterally floating clamp means disposed on opposite sides of the blade body for sensing the location of that body and releasably clamping it essentially without disturbing any waviness; movable abrading means for abrading a lateral surface of a cutting tooth with the body clamped; and indexing means for rotatably indexing the blade to a position for abrading of a correspondingly positioned lateral surface of a successive tooth. According to the improvement of the present invention, advancing means are provided for advancing the abrading means of the above combination to essentially the same abrading locations relative to the same plane perpendicular to the axis of rotation of the blade body, during each successive abrading operation.

Other objects and advantages of the present invention will become apparent from the following detailed description of preferred forms of the present invention, with reference to the accompanying drawings in which like numerals refer to like elements, and in which;

THE DRAWINGS

FIG. 1 is a side elevational view depicting apparatus according to the improvement of the present invention;

FIG. 2 is a partial top plan view of the apparatus of FIG. 1;

FIG. 3 is a schematic illustration depicting the principles of the improvement according to the present invention; and FIG. 4 is a partially schematic illustration of a sensing and clamp means utilizable with the improvement according to the present invention.

DETAILED DESCRIPTION

With reference to FIGS. 1 and 2, an apparatus for practicing the improvement of the present invention will be described. The illustrated apparatus may be employed for abrading lateral cutting surfaces of cutting teeth of a rotary saw blade 10. The blade 10 is of the type which includes carbide cutting teeth inserts 12 circumferentially spaced about the outer periphery of the blade body 14. The schematic showing of the blade 10 with the inserts 12 is intended to represent a negative angle blade, the configuration of which is well known.

As indicated at 16, a suitable mounting is provided for supporting the blade for rotation about an axis indicated at 18. If desired, the mounting may be essentially identical to that employed when the blade is mounted for use in a cutting operation. For example, the mounting may take the form of that disclosed in U.S. Pat. application Ser. No. 47,830 filed June 9, 1970 by Willy J. Goellner for "Carbide Saw Blade Locking Device," and assigned to the assignee of the present invention. The disclosure of that application is hereby incorporated by reference.

Suitable means is provided for rotating the mounting means 16 along with the blade 10 about the axis 18. This means preferably takes the form of an indexing means 19 for sequentially rotating the mounting means 16 and blade 10 by a desired angular extent, i.e., one equal to the circumferential spacing between the carbide inserts 12. Any suitable motor means may suffice for this purpose.

Adjacent the blade 10, a support assembly 20 may be provided. This support assembly 20 is operative to support a grinding means assembly 22 and two clamping means schematically shown at 24 and 26. The illustrated grinding means assembly 22 includes a grinding head 28 suitably attached to a saddle 30. The saddle 30 is slidably mounted for reciprocal movement on generally parallel ways 32 located on the upper portion of the support assembly 20. As will be apparent, legs of the saddle 30 are slidably received for translation on the ways 32 toward and away from the blade 10, and these legs may cooperate with stop means 36 on the ways 32 to limit the feed of the grinding means assembly 22 toward the axis 18 of blade rotation. Similar stop means 37 may be employed to limit the travel of the saddle 30 away from the axis of rotation 18.

Feeding of the grinding means assembly may be accomplished in any suitable manner. For example, a threaded driving rod 38 may be suitably secured to the saddle 30. One end of the threaded rod 38 may threadedly engage with the internal threaded periphery of a split nut 40. The nut 40 may be mounted for rotation by means of the output shaft 42 of a suitable reversible motor 44 mounted on the support member 20. Suitable limit switches may be associated with the stops 36 and 38 for preventing the rotation of the nut 40 by the motor 44 after the saddle 22 reaches its limit positions. As will be apparent, rotation of the nut 40 in opposite directions would be operative to translate the saddle 30 in opposite directions through the threaded cooperation with the rod 38. Of course, suitable provision is made to accomodate the length of the threaded rod 38 during saddle retraction to the stop means 37.

Rotatably mounted on the grinding head 28 is a grinding wheel 46. The grinding wheel may be rotatably driven by suitable motor means indicated schematically at 48 in FIG. 2 but omitted from FIG. 1 for clarity of illustration.

The previously noted clamp means 24 and 26 are respectively supported on the support assembly or table 20 on opposite sides of the blade body 14. These clamping means 24 and 26 cooperate to clamp the blade body 14 in position during a grinding operation as depicted in FIG. 1. As hereinafter more fully described in connection with FIG. 4, this clamping operation is performed essentially without disturbing any waviness in the blade body.

As will be apparent with continued reference to FIGS. 1 and 2, the mounting of the clamping means 24 and 26 is such as to not interfere with operation of the grinding wheel 46 or with indexing rotation of the saw blade 10. Any suitable arrangement may be employed to provide such a mounting. For example, the support assembly 20 may include a stepped shelf portion 50 disposed on one side of the mounted blade 10. One of the clamping means 26 may be mounted on this support shelf 50 as indicated at 52. A mounting comprised of offset bracket arms 53 and 54 ultimately supported on the table 50 as indicated at 55 may be employed to dispose the other clamp means 24 on the other side of the mounted blade body 14. The clamp means 24 and 26 are thus supported in generally oppositely facing aligned relationship on opposite sides of the blade body.

In operation according to the present invention, the clamps 24 and 26 are employed to grip or clamp the body 14 of the saw blade essentially without disturbing any waviness of the body, adjacent the cutting surface to be abraded. The grinding wheel 46 of the grinding means assembly 22 is then employed to abrade a lateral surface of the carbide cutting tooth insert 12 appropriately positioned in relatiOn to the grinding assembly 22. A grinding operation entails feeding of the saddle 22 through appropriate means (such as the rotatable nut 40 cooperating with the threaded rod 38), and rotation of the grinding wheel 46. As depicted in FIG. 1, the feeding may take place in a plane generally perpendicular to the axis of rotation 18 of the blade 10.

After performance of the abrading operation associated with one of the carbide inserts 12, the clamp means 24 and 26 are released from the blade body 14. The body 14 is thereafter indexed to bring the next successive tooth into position for a subsequent abrading operation. An essentially identical abrading operation from the standpoint of orientation with respect to a plane perpendicular to the axis of rotation 18 of the blade 14 is then carried out. In other words, the means provided for feeding or advancing the abrading means assembly 22 is operative to so advance that assembly to essentially the same abrading locations relative to the same plane perpendicular to the axis of rotation of the blade body, during each successive abrading operation. Through the performance of each of the successive abrading steps at essentially the same location relative to the same plane perpendicular to the axis of rotation of the blade body, and with the blade body 14 clamped without disturbing any waviness, all correspondingly oriented lateral cutting surfaces of successive teeth are essentially identically oriented with respect to any plane perpendicular to the blade rotation axis 18. Thus, during a cutting operation with the blade 10, the relative location between each corresponding lateral cutting surfaces and the workpiece remains essentially the same independently of any waviness in the blade body.

From the foregoing, it will be appreciated that the present invention is concerned with orientation of lateral cutting surfaces of cutting teeth of a rotatable saw blade. In this connection, it may be noted that all of the foregoing discussion in connection with FIGS. 1 and 2 was directed to such faces disposed on one side of the blade body. Symmetrical faces are located on the opposite side of the blade body. Moreover, as will be recognized by those skilled in the art, each carbide insert 12 may be comprised of a primary tooth and a secondary tooth including a plurality of lateral cutting faces, and the present invention may be employed in connection with abrading operations associated therewith.

If desired, the grinding head 28 coupled to the saddle 30 may be suitably mounted for reorientation relative to that saddle 30 depending on the configuration and intended orientation of the tooth surface to be abraded. Similarly, provision may be made for adjusting the direction of feed of a grinding assembly in practicing the present invention. However, in any event, the abrading face of the grinding tool itself is operated in the same abrading location for all teeth after the appropriate depth and orientation of the grinding assembly is set for any side grind, i.e., a grind associated with a lateral cutting surface.

With reference to FIG. 3, further aspects of the improvement according to the present invention may be understood. In FIG. 3, a flat plan of a blade 10 is schematically depicted. The blade body 14 has, as illustrated, a degree of waviness which would result in run out of the blade during use. However, the clamping means 24 and 26 are operated in connection with each grinding operation to avoid disturbing the waviness in the blade body 14. This may be accomplished by employing the clamping means to sense the location of the blade body and then to clamp the blade at essentially that precise location.

The grinding assembly 22 including the grinding wheel 46 is illustrated schematically in FIG. 3. The arrangement of FIG. 3 is illustrative of an angular orientation of the grinding wheel 46 employed in connection with grinding of a lateral cutting surface 56 that lies in a plane at an angle with respect to planes perpendicular to the axis of rotation of the blade 10. It will be readily apparent that through practice of the present invention the laterally outermost portions of the face 56 would be all located in the same plane as indicated by the lines 58, after the successive indexing and grinding operations are performed. At the same time, the angle of inclination with respect to planes perpendicular to the axis of blade rotation would be identical for each surface 56, i.e., the teeth would be congruently oriented.

With reference now to FIG. 4, a suitable arrangement for insuring that the clamp means is operational without disturbing the waviness of the blade body may be seen. The clamp means 24 may include an apertured bearing member or sleeve schematically shown at 60. This sleeve may be fixedly mounted with respect to the shelf 50 of the support assembly and slidably receives a hollow stem 62. One end of the stem remote from the blade body 14 may be appropriately threaded, as indicated at 64, to cooperate with a drive gear 66. The drive gear 66 may be suitably mounted for rotation by means of a suitable reversible motor 68. It will be apparent that rotation of the motor 68 in opposite directions is operative to translate the stem 62 within the bearing sleeve 60 toward and away from the blade body 14.

The hollow stem 62 may receive a sensing member or rod 70 that normally axially projects therebeyond toward the blade body 14. The sensing rod 70 may be biased to its projecting position by means of a spring 72 within the stem 62 acting on a collar 74 integral with the sensing rod 70.

As the illustrated stem 62 is translated toward the blade body through appropriate rotation of the drive gear 66 by means of the motor 68, the sensing rod 70 will engage the blade body 14 and be caused to move rearwardly relative to the stem 62 against the bias of the spring 72. Upon completion of this rearward movement, the sensing rod 70 cooperates with a micro-switch 74 so as to halt advancing movement of the stem 62, in a manner which will become apparent. Appropriate dimensional relationships and delays associated with halting of advancing movement place the front surface 61 of the rod 62 at the blade body 14. The gear and thread drive arrangement is such that, upon such halting, the stem 62 functions as a fixed clamp against the blade body. However, essentially no distortion of any waviness in the blade body would be introduced. A similar clamping stem associated with the other clamping means 26 may be employed to engage the opposite side of the blade body 14 to complete the clamping operation.

Prior to indexing for subsequent grinding operations, the clamping stem 62 is retracted through reverse rotation of the motor 68. During this retraction, a suitable shoulder 76 projecting from the body of the clamping stem 62 may cooperate with a suitable limit micro-switch 78. When the projection 76 actuates micro-switch 78, retracting movement of the clamping stem 62 is halted.

As may be seen in FIG. 4, the motor 68 may be driven by suitable AC power source 79. One lead from the power source is illustrated as being provided with switch means 80 that is operative to cause reversing movement of the motor 68. In the illustrated position, the switch means 80 is in a condition to enable current flow to the motor 68 through the contact 82 and the limit switch 78, with the current flow being such as to cause retracting movement of the clamping stem 62. However, the limit micro-switch 78 will be moved to an open position by the shoulder 76 so as to cut off such current flow, thereby stopping the retracting movement of the clamping stem 62, when the stem 62 reaches the full reverse position.

In this position, the micro-switch 74 carried by the clamping stem 62 is in its biased closed, i.e., not actuated, position insofar as the sensing rod 70 is biased to its outer projecting position. This condition of that micro-switch 74 is operative to enable advancing movement of the stem 62 upon appropriate passing of current to the motor 68 when the reversing switch 80 is conditioned with respect to the other contact 84.

After the blade body 14 is properly indexed, the reversing switch 80 is so conditioned by an operator. Thus, the clamping stem 62 is advanced along with the sensing rod 70 carried thereby. After suitable depression of the sensing rod 70 resulting from engagement with the blade body 14, the micro-switch 74 is actuated to halt advancing movement by cutting off current flow to the motor 68.

Reverse movement causing retraction of the clamping stem 62 is accomplished by reversing the condition of the reversing switch 80 to the illustrated position so as to pass current to the motor 68 through the biased closed limit micro-switch 78 until that switch is actuated as above discussed. At this time, retraction is completed, and the micro-switch 74 closes again since the sensor rod 70 is biased to its outer position.

It will be appreciated that the second clamping means 26 may be identical to the sensing and clamping means 24 discussed in connection with FIG. 4. Alternatively, with the one clamping means functioning as a sensing means to be appropriately located adjacent the blade body 14, the other clamping means 26 need only be advanced to clampingly cooperate with the first clamping means 24 without the need for any sensing arrangement. It will also be apparent that other clamping arrangements for avoiding disturbance of any waviness of the blade body 14 may be employed.

The foregoing description of the improvement according to the present invention has been made specifically in connection with grinding operations. It will, however, be appreciated that the principles of the invention may be applied in connection with any other operation affecting the orientation of the lateral cutting surfaces, such as when the carbide inserts 12 are braised in position. This positioning, of course, results in an initial orientation of the lateral cutting faces relative to a plane perpendicular to the axis of rotation of the blade. Through clamping the blade in position without disturbing the waviness of the body and through performing the orienting operation (e.g. the brazing of the tips in position) in an identical fashion with respect to a plane perpendicular to the axis of blade rotation, the present invention may be practiced in such initial positioning operations. In this fashion, the amount of side grinding to be subsequently performed may be significantly reduced.

It may be here noted that through practice of the present invention, it may be possible to minimize or eliminate the need for dubbing of a carbide insert tip. Dubbing constitutes a grinding operation associated with the vertical side edge of each tooth in a plane parallel to the surface of the blade body. Such grinding is intended to eliminate the sharp edge so as to enable the blade to tend to track itself through the cut.

It will also be recognized that the present invention is not limited to carbide tipped saw blade operations although it finds particular utility and advantages therein. Abrading operations associated with lateral cutting surfaces of any movable saw blade may be practiced according to the present invention.

Although the invention has been described in connection with preferred forms thereof, it will be appreciated by those skilled in the art that additions, substitutions, modifications, and deletions may be made without departing from the spirit and scope of the invention as defined in the appended claims.

What is claimed is:

1. In a method of abrading lateral cutting surfaces of cutting teeth of a rotary saw blade including the steps of: gripping the saw blade, prior to abrading of one lateral surface, between clamp means on opposite sides of the blade body, with the gripping step comprising sensing the location of the blade body and clamping the body in the location essentially without disturbing any existing waviness thereof; abrading the one lateral surface with abrading means while the blade is gripped; releasing the saw blade from the grip of the clamp means; indexing the saw blade for subsequent abrading of a correspondingly oriented lateral surface; and repeating the steps of gripping, releasing and abrading in connection with that correspondingly oriented lateral surface; the improvement comprising:

performing each of the abrading steps with the abrading means operating at the same operating position relative to the same plane perpendicular to the axis of rotation of the blade body, whereby all correspondingly oriented lateral cutting surfaces that are abraded are congruently oriented with respect to any plane perpendicular to the axis of rotation of the blade body, essentially independently of any waviness in the blade body.

2. In a method of performing an operation effecting orientation of the lateral cutting surfaces of cutting teeth of a rotary saw blade including the steps of: gripping the saw blade, prior to performing the orienting operation in connection with one of the lateral surfaces, between clamp means on opposite sides of the blade body, with the gripping step comprising sensing the location of the blade body and clamping the body in the location essentially without disturbing any existing waviness thereof; performing the orientation effecting operation while the blade is gripped; releasing the saw blade from the grip of the clamp means; indexing the saw blade for a subsequent one of said operations in connection with a correspondingly oriented lateral surface; and repeating the steps of gripping, releasing and performing the orientation operation in connection with that correspondingly oriented lateral surface; the improvement comprising:

performing each of said orientation effecting operations at the same operating position relative to the same plane perpendicular to the axis of rotation of the blade body, whereby the laterally outermost portions of each of said lateral surfaces lie in a common plane.

3. The improvement according to claim 2 wherein the steps of performing said orientation effecting operations comprise abrading the lateral surfaces.

4. The improvement according to claim 2 wherein the cutting teeth comprise inserts and wherein the steps of performing said orientation effecting operations comprise brazing the inserts in position on the blade body.

5. In an apparatus for abrading lateral cutting teeth of a rotary saw blade including: laterally floating clamp means on opposite sides of the blade body for sensing the location of that body and releasably clamping said body essentially without disturbing any waviness; movable abrading means for abrading a lateral cutting surface with the body clamped; and indexing means for rotatably indexing the blade to a position for abrading of correspondingly positioned lateral surfaces of successive teeth; the improvement comprising:

advancing means for advancing said abrading means to essentially the same abrading locations relative to the same plane perpendicular to the axis of rotation of the blade body, during each successive abrading operation.

* * * * *

UNITED STATES PATENT OFFICE
CERTIFICATE OF CORRECTION

Patent No. 3,738,201　　　　　　　　Dated June 12, 1973

Inventor(s) Rudolph L. Allison

It is certified that error appears in the above-identified patent and that said Letters Patent are hereby corrected as shown below:

In the heading, line 21, change --186,520-- to "183,520".

Signed and sealed this 16th day of April 1974.

(SEAL)
Attest:

EDWARD M.FLETCHER,JR.　　　　　　　C. MARSHALL DANN
Attesting Officer　　　　　　　　　Commissioner of Patents